Patented Dec. 19, 1950

2,534,260

UNITED STATES PATENT OFFICE 2,534,260

DIGITALIS EXTRACTION

Ole Gisvold, Minneapolis, Minn., assignor to Regents of the University of Minnesota, Minneapolis, Minn., a corporation of Minnesota No Drawing. Application June 23, 1949, Serial No. 100,959

8 Claims. (Cl. 260—210.5)

The present invention relates to a novel process of isolating digitalis glycosides from plant material containing the same.

The present application is a continuation-in-part of my copending application Serial No. 719,931 filed January 2, 1947, now Patent No. 2,500,173, entitled "Extraction of Digitalis Glycosides."

According to the above identified application, it was found possible to extract the active glycosides of digitalis by means of an aqueous solution. According to that process the fresh plant material was subjected to disintegration for the purpose of rupturing all or nearly all of the plant cells. This disintegration was followed by an extraction of the disintegrated plant material with water and resulted in the production of a clear solution of the digitalis glycosides by filtration of the resultant extract. Chlorophyll was then precipitated at temperatures around 60° C. and was then removed. The aqueous solution thus obtained was capable of use as such or could be worked up into pure digitalis glycosides in accordance with known procedures or in accordance with procedures disclosed in said application.

According to the present invention it has been found that it is possible to isolate substantially pure digitalis glycosides from the aqueous solution in a very simple manner.

It is, therefore, an object of the present invention to provide a novel process of isolating digitalis glycosides from an aqueous solution prepared directly from the plant material.

In carrying out the present invention it has been found that the aqueous extract of the digitalis glycosides can be prepared in the same manner as disclosed in my copending application. To this end the plant material containing digitalis glycosides, such as plants either in the form of fresh and still moist leaves and other plant parts or in the form of leaves preserved by fast freezing methods, is mixed with water and subjected to thorough disintegration capable of rupturing of all or nearly all of the plant cells. This disintegration may be accomplished by means of a disintegrating device, such as the Waring Blendor, where relatively small batches are handled or a Reitz Disintegrator, Type RD-18, where large batches are handled. The disintegration permits the water in which the plant material is suspended while being disintegrated to reach the digitalis glycosides contained in the plant cells, and the digitalis glycosides being water soluble are transferred to the aqueous medium which is then separated from the aqueous mass of disintegrated plant material by filtration or centrifuging. However, chlorophyll and other materials, which are undesirable so far as the digitalis preparation is concerned, also find their way into the aqueous medium. It has been discovered that these undesirable constituents can be removed without harmful effect by heating the separated aqueous liquor to a temperature in the range of 60° C. to 80° C., preferably about 60° C. for a short period of time. Usually it is sufficient just to bring the aqueous liquor up to temperature. The heating facilitates coagulation and precipitation of the chlorophyll and other undesirable constituents and seems to inactivate enzymes. Thereafter, the coagulated chlorophyll and other material which has been rendered insoluble may be removed by filtration for example through filter paper or a muslin pad with or without the addition of a filter aid. The insoluble undesirable constituents can also be removed by centrifuging. As a result of this filtration or centrifuging there results a light amber colored aqueous solution containing practically all of the active glycosides (digitalis) originally present in the leaf.

From this aqueous solution the digitalis glycosides may be recovered in various ways. The aqueous solution may be extracted with a water immiscible, low aliphatic ketone solvent, such as methyl ethyl, diethyl, methyl propyl, ethyl propyl, methyl isobutyl and methyl butyl ketones. For purposes of illustration, the invention will be described with particular reference to methyl isobutyl ketone, which is the preferred solvent. It is to be understood, however, that the invention is not limited thereto.

After extraction of the aqueous solution with several quantities of the methyl isobutyl ketone, the solvent portions are combined and concentrated to a small volume. At the later stages of concentration a white crystalline substance may separate. Distillation is then stopped and the mixture allowed to cool to room temperature and stand for an extended period of time during which crystallization occurs. Crystals formed by this treatment may be removed by filtration and washed with small quantities of methyl isobutyl ketone. The crystals thus obtained are in most cases almost pure white. In others they may be of varying shades of yellow. They all give the characteristic Keller-Kiliani color test for the digitalis glycosides.

Further purification of the crystalline glycosides may be accomplished by dissolving the crystalline glycosides in a low aliphatic alcoholic solvent, such as methanol, to which has been added some of the ketonic solvents, such as methyl isobutyl ketone and a quantity of water. The mixture is agitated and then allowed to stand for the mixture to separate into two distinct layers. The methyl isobutyl ketone layer contains the purified digitalis glycosides and may be separated and concentrated under vacuum to a small volume. By cooling this concentrated extract to room temperature and allowing it to stand for an extended period of time, white crystalline digitalis glycosides separate and may be removed by filtration and may be washed with small quantities of methyl isobutyl ketones. The crystals thus obtained are almost pure white and give the positive Keller-Kiliani color test that is characteristic of the digitalis glycosides.

From *Digitalis lanata* a very large quantity of crystals is obtained. From *Digitalis lutea* the results are the same, with the exception that the yields of crystalline material are considerably smaller. With *Digitalis purpurea* the glycosides obtained are not crystalline but at least 90% of the active glycosides of the plant material are obtained in an amorphous state, as determined by biological assay methods.

Another method of isolating the glycosides is as follows: The aqueous filtrate containing the digitalis glycosides extracted directly from the plant material may be mixed with filter cell and the resultant mixture saturated with a neutral alkali metal salt such as sodium or potassium sulfates or chlorides. This results in the precipitation of the digitalis glycosides and the solid material obtained is composed of a mixture of the filter cell and the glycosides. This moist solid material may then be extracted with one of the above solvents, such as methyl isobutyl ketones, and the solution separated from the solid material. This solution may then be concentrated to a small volume and the light colored crystalline digitalis glycosides crystallized from the concentrated solution at room temperature. The crystals thus obtained after washing with a small quantity of methyl isobutyl ketone are almost pure white in some cases, while in others they are of varying shades of yellow. They give the characteristic Keller-Kiliani color test for the digitalis glycosides. The glycosides precipitated on the filter cell in this manner may be kept in an air dried state for long periods of time, for example over a year, after which they may be moistened and extracted with methyl isobutyl ketone and the same treatment applied for the isolation of the crystalline digitalis glycosides.

In this modified manner of proceeding the same results are obtained with *Digitalis lutea* through the amounts of crystals obtained are smaller. Likewise, in the case of *Digitalis purpurea* the digitalis glycosides are not obtained in a crystalline form but over 90% of the active glycosides are obtained in an amorphous state, as determined by biological assay methods.

The following examples will serve to illustrate the invention:

*Example I*

One thousand grams of fresh leaves of *Digitalis lanata* were disintegrated in portions of about 200 grams each in the presence of 400 cc. of water in the Waring Blendor for about 10 minutes. This product was heated on the steam bath until a temperature of about 70° C. was obtained. This mixture was filtered on a Buchner funnel and the solid mass washed with hot water 80–90° C. A total volume of about 3 liters of aqueous extract was obtained. This aqueous solution was extracted with three 300 cc. portions of methyl isobutyl ketone. The methyl isobutyl ketone portions were combined and concentrated under vacuum to a volume of about 20 cc. During the latter stages of concentration, a white crystalline substance separated from the methyl isobutyl ketone solution. The distillation was stopped and the mixture allowed to stand overnight and to cool to room temperature, whereupon crystals precipitated out. The crystals were removed by filtration and were subsequently washed with a small amount, 10 to 20 cc., of methyl isobutyl ketone. The crystals thus obtained were, in some cases, almost pure white. In others, they were varying shades of yellow. They gave the characteristic Keller-Kiliani color test for the digitalis glycosides.

The first 300 cc. of portion of methyl isobutyl ketone contained most of the crystalline glycosides.

0.5 gram of the crystalline glycosides was dissolved in about 35 cc. of methanol to which was added 350 cc. of methyl isobutyl ketone followed by 350 cc. of water. The mixture was shaken for about one minute and then allowed to stand in a separatory funnel until two distinct layers were obtained. The methyl isobutyl ketone layer was separated and concentrated under vacuum to a small volume, 10 to 20 cc. During the latter stages of this concentration, a white crystalline substance separated from the methyl isobutyl ketone solution. The distillation was halted and the mixture allowed to stand overnight and to cool to room temperature, whereupon crystals formed. The crystals were removed by filtration and were subsequently washed with a small amount, 10 to 20 cc., of methyl isobutyl ketone. The crystals thus obtained were almost pure white. They gave the positive Keller-Kiliani color test that is characteristic of the digitalis glycosides. These crystals melted at 190–210° C. According to the USP XIII Cat. Assay Method for cardiac active principles these crystals have 85% of the cardiac activity of pure digitoxin.

*Example II*

*Digitalis lutea* was substituted for *Digitalis lanata* in the procedure of Example I. The same results were obtained with the exception that the yields of crystalline material (glycosides) were considerably smaller. These crystals melted at 190–210° C.

*Example III*

*Digitalis purpurea* was substituted for *Digitalis lanata* in the procedure of Example I. While no crystalline material was obtained by this procedure, an amorphous residue was obtained. At least 90% of the active glycosides in the plant material were obtained in the amorphous state, as determined by biological assay methods.

*Example IV*

One thousand grams of fresh *Digitalis lanata* leaves were disintegrated and extracted with water in accordance with the procedure of Example I. The product was heated on the steam bath until a temperature of about 70° C. was obtained. This mixture was filtered in the solid mass on a Buchner funnel, washed with hot water at 80–90° C. The aqueous filtrate was mixed with about 200 grams of filter cell and the mixture saturated with sodium sulphate. This mixture was filtered and the solid material was collected on a Buchner funnel. The solid material was divided into two portions while it was still wet. One portion was air dried and the other was shaken with three successive 150 cc. portions of methyl isobutyl ketone. The methyl isobutyl ketone was separated from the solid material. This solution was concentrated under vacuum to a volume of about 10 cc. During the latter stages of concentration, a white crystalline substance separated from the methyl isobutyl ketone solution. The mixture was allowed to stand overnight at room temperature for further crystallization. The crystals were removed by filtration and were subsequently washed with a small amount, 10 to 20 cc., of methyl isobutyl ketone. The crystals thus obtained were in some cases almost pure white. In others they were varying shades of yellow. They gave the characteristic Keller-Kiliani color test for the digitalis glycosides. These crystals melted at 190–210° C.

The air dried portion after storage for a year was moistened with water and treated as described above with the same results.

The same results were obtained with *Digitalis lutea*, however, smaller amounts of crystals were obtained.

In the case of *Digitalis purpurea*, no crystals were obtained, however about 90 per cent of the acting glycosides were obtained in an amorphous state as determined by biological assay methods.

While various modifications of the invention have been described, it is to be understood that the same is not limited thereto but that other variations may be possible without departing from the spirit thereof.

What I claim is:

1. The process of preparing digitalis glycosides which comprises comminuting plant material containing digitalis and selected from the group consisting of fresh, moist plant material and such material preserved by quick-freezing until at least most of the plant cells containing the digitalis glycosides are ruptured, extracting the disintegrated plant material with water to produce a preliminary aqueous extract, heating the preliminary extract to about 60° C. to coagulate the chlorophyll and other undesired constituents, separating insoluble material from the preliminary extract to produce a light colored aqueous extract substantially free from chlorophyll, extracting the aqueous extract with a water immiscible low aliphatic ketone solvent for the digitalis glycosides and separating the digitalis glycosides from the ketone solvent.

2. The process of producing digitalis glycosides which comprises comminuting plant leaves containing digitalis glycosides and selected from the group consisting of fresh, moist leaves and leaves preserved by quick-freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free from chlorophyll, precipitating glycosides from the aqueous extract by the addition of a neutral alkali metal salt, separating the precipitated glycosides from the aqueous extract, extracting the precipitated glycosides with a water immiscible, low aliphatic ketone solvent for the digitalis glycosides and recovering the digitalis glycosides from the ketone solvent.

3. The process of preparing digitalis glycosides which comprises comminuting plant material containing digitalis and selected from the group consisting of fresh, moist plant material and such material preserved by quick-freezing until at least most of the plant cells containing the digitalis glycosides are ruptured, extracting the disintegrated plant material with water to produce a preliminary aqueous extract, heating the preliminary extract to about 60° C. to coagulate the chlorophyll and other undesired constituents, separating insoluble material from the preliminary extract to produce a light colored aqueous extract substantially free from chlorophyll, extracting the aqueous extract with methyl isobutyl ketone to produce a solution of the digitalis glycosides, concentrating the digitalis glycosides solution and recovering digitalis glycosides from said solution.

4. The process of preparing digitalis glycosides which comprises comminuting plant material containing digitalis and selected from the group consisting of fresh, moist plant material and such material preserved by quick-freezing until at least most of the plant cells containing the digitalis glycosides are ruptured, extracting the disintegrated plant material with water to produce a preliminary aqueous extract, heating the preliminary extract to about 60° C. to coagulate the chlorophyll and other undesired constituents, separating insoluble material from the preliminary extract to produce a light colored aqueous extract substantially free from chlorophyll, extracting the aqueous extract with methyl isobutyl ketone to produce a solution of the digitalis glycosides, concentrating the digitalis glycosides solution and crystallizing the digitalis glycosides from the methyl isobutyl ketone solution.

5. The process according to claim 4 in which the crystalline digitalis glycosides are extracted with a mixture of aqueous methanol and methyl isobutyl ketone and the digitalis glycosides crystallized from the methyl isobutyl ketone solution thus produced.

6. The process according to claim 2 in which the precipitated digitalis glycosides are extracted with methyl isobutyl ketone and the digitalis glycosides are crystallized from the methyl isobutyl ketone solution thus produced.

7. The process of producing digitalis glycosides which comprises comminuting plant leaves containing digitalis glycosides and selected from the group consisting of fresh, moist leaves and leaves preserved by quick-freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free from chlorophyll, precipitating glycosides from the aqueous extract by the addition of sodium sulfate, separating the precipitated glycosides from the aqueous extract, extracting the precipitated glycosides with a water immiscible, low aliphatic ketone solvent for the digitalis glycosides and recovering the digitalis glycosides from the ketone solvent.

8. The process of producing digitalis glycosides which comprises comminuting plant leaves containing digitalis glycosides and selected from the group consisting of fresh moist leaves and leaves preserved by quick-freezing, extracting the comminuted leaves with water to produce a preliminary aqueous extract, heating the preliminary extract to about 60° C. to coagulate the chlorophyll and other undesired constituents, separating the insoluble material from the crude extract to produce a light colored aqueous extract substantially free of chlorophyll, precipitating digitalis glycosides therefrom by the addition of solid sodium sulfate, separating the precipitated digitalis glycosides from the aqueous extract, extracting the precipitated digitalis glycosides with methyl isobutyl ketone and crystallizing the digitalis glycosides from the methyl isobutyl ketone extract.

OLE GISVOLD.

No references cited.